United States Patent
Shirai et al.

(10) Patent No.: US 11,691,577 B2
(45) Date of Patent: Jul. 4, 2023

(54) SHIELDED ELECTRIC WIRE INCLUDING A CONDUCTOR HAVING OUTER DIAMETER SET BASED ON THERMAL EXPANSION AND AN INSULATOR HAVING THICKNESS BASED ON THERMAL EXPANSION AND WIRE HARNESS

(71) Applicant: Yazaki Corporation, Tokyo (JP)

(72) Inventors: Mizuki Shirai, Susono (JP); Hiroki Kondo, Susono (JP); Noriyuki Abe, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/387,364

(22) Filed: Jul. 28, 2021

(65) Prior Publication Data

US 2022/0032861 A1 Feb. 3, 2022

(30) Foreign Application Priority Data

Jul. 29, 2020 (JP) .................... 2020-128038

(51) Int. Cl.
*B60R 16/02* (2006.01)
*H01B 7/20* (2006.01)
*H01R 13/6592* (2011.01)

(52) U.S. Cl.
CPC ......... *B60R 16/0207* (2013.01); *H01B 7/201* (2013.01); *H01R 13/6592* (2013.01)

(58) Field of Classification Search
None
See application file for complete search history.

(56) References Cited

U.S. PATENT DOCUMENTS 6,978,825 B1 * 12/2005 Baylot .................... E21B 17/01
165/45
7,700,879 B2 * 4/2010 Watanabe ................. H01B 7/16
174/102 R (Continued)

FOREIGN PATENT DOCUMENTS

CN 1306668 A * 8/2001 ............. H01B 7/288
CN 102088171 A * 6/2011 ............. B60L 50/16

(Continued)

OTHER PUBLICATIONS

WO2004086418 (original and translated) (Year: 2004).*

(Continued)

*Primary Examiner* — Timothy J. Dole
*Assistant Examiner* — Muhammed Azam
(74) *Attorney, Agent, or Firm* — Sughrue Mion, PLLC

(57) ABSTRACT

A shielded electric wire includes one metal pipe and one electric wire having a conductor and an insulator. An outer diameter of the conductor at 25° C. is set as a, a coefficient of linear expansion of the conductor is set as $\alpha_a$, and a temperature difference between a maximum temperature and 25° C. is set as $\Delta t$, an outer diameter a' of the conductor after thermal expansion is $a'=a+\alpha_a \times a \times \Delta t$, and when a wall thickness of the insulator at 25° C. is set as b and a coefficient of linear expansion of the insulator is set as $\alpha_b$, an insulator wall thickness b' after thermal expansion is $b'=b+\alpha_b \times b \times \Delta t$, and an inner diameter c of the one metal pipe is set to satisfy $c \geq a'+2b'$.

5 Claims, 3 Drawing Sheets

(56) References Cited

U.S. PATENT DOCUMENTS

| | | | | |
|---|---|---|---|---|
| 7,896,033 | B2 * | 3/2011 | Hallot | F16L 1/16 |
| | | | | 138/137 |
| 9,308,584 | B2 * | 4/2016 | Burgess | B22F 7/002 |
| 10,788,157 | B2 * | 9/2020 | Smahl | F16L 59/14 |
| 2002/0170729 | A1 * | 11/2002 | Murakami | H01B 9/028 |
| | | | | 174/394 |
| 2004/0099427 | A1 | 5/2004 | Kihira | |
| 2008/0156516 | A1 | 7/2008 | Watanabe | |
| 2009/0308632 | A1 * | 12/2009 | Watanabe | H01B 7/20 |
| | | | | 174/102 R |
| 2011/0011613 | A1 * | 1/2011 | Brown, Jr. | H02G 3/0468 |
| | | | | 174/68.3 |
| 2011/0308709 | A1 * | 12/2011 | Ouellette | B29C 53/821 |
| | | | | 156/499 |
| 2013/0341060 | A1 * | 12/2013 | Kozawa | H01B 7/202 |
| | | | | 174/68.3 |
| 2016/0189828 | A1 * | 6/2016 | Oga | B60R 16/0215 |
| | | | | 174/72 A |
| 2016/0257267 | A1 * | 9/2016 | Nakai | H01B 7/0045 |
| 2016/0295755 | A1 * | 10/2016 | Lee | H02G 3/0481 |
| 2017/0015259 | A1 * | 1/2017 | Adachi | B60R 16/0215 |
| 2018/0102203 | A1 * | 4/2018 | Nakai | H01B 7/0009 |
| 2018/0174709 | A1 * | 6/2018 | Hagi | H02G 3/0468 |
| 2018/0301242 | A1 * | 10/2018 | Sugino | H02G 1/08 |
| 2019/0222015 | A1 * | 7/2019 | Ito | B60R 16/0215 |
| 2019/0312418 | A1 * | 10/2019 | Kawashita | H01R 13/6592 |
| 2019/0387653 | A1 * | 12/2019 | Kimoto | H01R 13/6592 |
| 2022/0032861 | A1 * | 2/2022 | Shirai | H01R 13/6592 |

FOREIGN PATENT DOCUMENTS

| | | | | | |
|---|---|---|---|---|---|
| CN | 103958281 | A | * | 7/2014 | B60R 16/0215 |
| CN | 104245429 | A | * | 12/2014 | B60R 16/0215 |
| CN | 105741957 | A | * | 7/2016 | |
| CN | 105788713 | A | * | 7/2016 | |
| CN | 112331396 | A | * | 2/2021 | H01B 7/0009 |
| EP | 0734096 | B1 | * | 3/1996 | |
| FR | 2941812 | A1 | * | 8/2010 | H01B 3/305 |
| JP | 63-39828 | U | | 3/1988 | |
| JP | 2004-171952 | A | | 6/2004 | |
| JP | 2005-32615 | A | | 2/2005 | |
| JP | 2008035625 | A | * | 2/2008 | |
| JP | 2012-111315 | A | | 6/2012 | |
| JP | 2015135116 | A | * | 7/2015 | F02M 31/20 |
| KR | 20060115989 | A | * | 11/2006 | |
| RU | 2700506 | C1 | * | 9/2019 | B32B 15/02 |
| WO | WO-0036614 | A1 | * | 6/2000 | B60R 16/0215 |
| WO | WO-2004003940 | A1 | * | 1/2004 | H01B 7/189 |
| WO | 2006/107050 | A1 | | 10/2006 | |
| WO | WO-2011096426 | A1 | * | 8/2011 | B60R 16/0207 |
| WO | WO-2011114801 | A1 | * | 9/2011 | B60R 16/0207 |
| WO | WO-2011114802 | A1 | * | 9/2011 | B60R 16/0215 |
| WO | WO-2012011503 | A1 | * | 1/2012 | B60R 16/0215 |
| WO | WO-2012026282 | A1 | * | 3/2012 | B60R 16/0215 |
| WO | WO-2012157770 | A1 | * | 11/2012 | B60R 16/0215 |
| WO | WO-2013012076 | A1 | * | 1/2013 | B60R 16/0207 |
| WO | WO-2013125679 | A1 | * | 8/2013 | B60R 16/0215 |
| WO | WO-2013169850 | A1 | * | 11/2013 | F16L 11/02 |
| WO | WO-2014034665 | A1 | * | 3/2014 | B60R 16/0207 |
| WO | WO-2014050737 | A1 | * | 4/2014 | B60R 16/0215 |
| WO | WO-2014050754 | A1 | * | 4/2014 | B60R 16/0215 |
| WO | WO-2015079881 | A1 | * | 6/2015 | B60R 16/0207 |
| WO | WO-2015098836 | A1 | * | 7/2015 | B60R 16/0215 |
| WO | WO-2018122572 | A1 | * | 7/2018 | H01B 3/441 |
| WO | WO-2018130271 | A1 | * | 7/2018 | D07B 1/148 |
| WO | WO-2020096243 | A1 | * | 5/2020 | H01B 7/02 |

OTHER PUBLICATIONS

WO2017221696 (original and translated) (Year: 2017).*
WO2018105391 (original and translated) (Year: 2018).*
WO2021044386 (original and translated) (Year: 2021).*

* cited by examiner

SHIELDED ELECTRIC WIRE INCLUDING A CONDUCTOR HAVING OUTER DIAMETER SET BASED ON THERMAL EXPANSION AND AN INSULATOR HAVING THICKNESS BASED ON THERMAL EXPANSION AND WIRE HARNESS

CROSS-REFERENCE TO RELATED APPLICATIONS

This application is based on and claims priority under 35 USC 119 from Japanese Patent Application No. 2020-128038 filed on Jul. 29, 2020, the contents of which are incorporated herein by reference.

TECHNICAL FIELD

The present invention relates to a shielded electric wire and a wire harness.

BACKGROUND ART

In the related art, a shielded electric wire has been proposed in which a plurality of electric wires are collectively put into a metal pipe to exert a shielding function and prevent foreign matter from interfering with the electric wire (see, for example, JP-A-2004-171952). In particular, by putting the plurality of electric wires into the metal pipe collectively and then connecting the metal pipe to the ground, ground connection of the shielded electric wire can be done only once.

However, in the shielded electric wire described in JP-A-2004-171952, a plurality of electric wires are collectively put in a metal pipe. Therefore, a diameter of the metal pipe tends to be large, and when the shielded electric wire is bent at the time of wiring to a vehicle or the like, a bending radius R of the shielded electric wire becomes large. As a result, it cannot be said that the wiring property of the shielded electric wire is good at all. Therefore, it is conceivable to reduce the diameter of the metal pipe as much as possible so that, for example, a plurality of electric wires and an inner surface of the metal pipe are brought into close contact with each other. However, in this case, the electric wire expands due to a temperature environment where the shielded electric wire is used, and thus the electric wire is crushed.

SUMMARY OF INVENTION

The present disclosure is made to solve such a problem of the related art and an object of the present disclosure is to provide a shielded electric wire and a wire harness which can prevent the electric wire from being crushed while suppressing a bending radius R and improving a wiring property.

According to an aspect of the present disclosure, there is provided a shielded electric wire including:

one metal pipe having a tubular shape; and an electric wire being only one electric wire provided in the one metal pipe, and having a conductor and an insulator provided on an outer circumference of the conductor, wherein when an outer diameter of the conductor at 25° C. is set as a, a coefficient of linear expansion of a conductor material of the conductor is set as $\alpha_a$, and a temperature difference between a maximum temperature exposed in an environment where the electric wire is used and 25° C. is set as $\Delta t$, an outer diameter a' of the conductor after thermal expansion with respect to the maximum temperature is $a'=a+\alpha_a \times a \times \Delta t$, and when a wall thickness of the insulator at 25° C. is set as b and a coefficient of linear expansion of an insulator material of the insulator is set as $\alpha_b$, an insulator wall thickness b' after thermal expansion with respect to the maximum temperature is $b'=b+\alpha_b \times b \times \Delta t$, and an inner diameter c of the one metal pipe is set to satisfy $c \geq a'+2b'$.

According to the present disclosure, it is possible to prevent the electric wire from being crushed while suppressing the bending radius R and improving the wiring property.

DESCRIPTION OF EMBODIMENTS

Hereinafter, the present disclosure will be described with reference to preferred embodiments. The present disclosure is not limited to the embodiments shown below and can be appropriately modified without departing from the spirit of the present disclosure. In the embodiments shown below, some parts of the configurations are not illustrated or explained. However, it goes without saying that, as for the details of the omitted technology, publicly known or well-known technology is appropriately applied as long as there is no contradiction with the contents described below.

Figure 1:
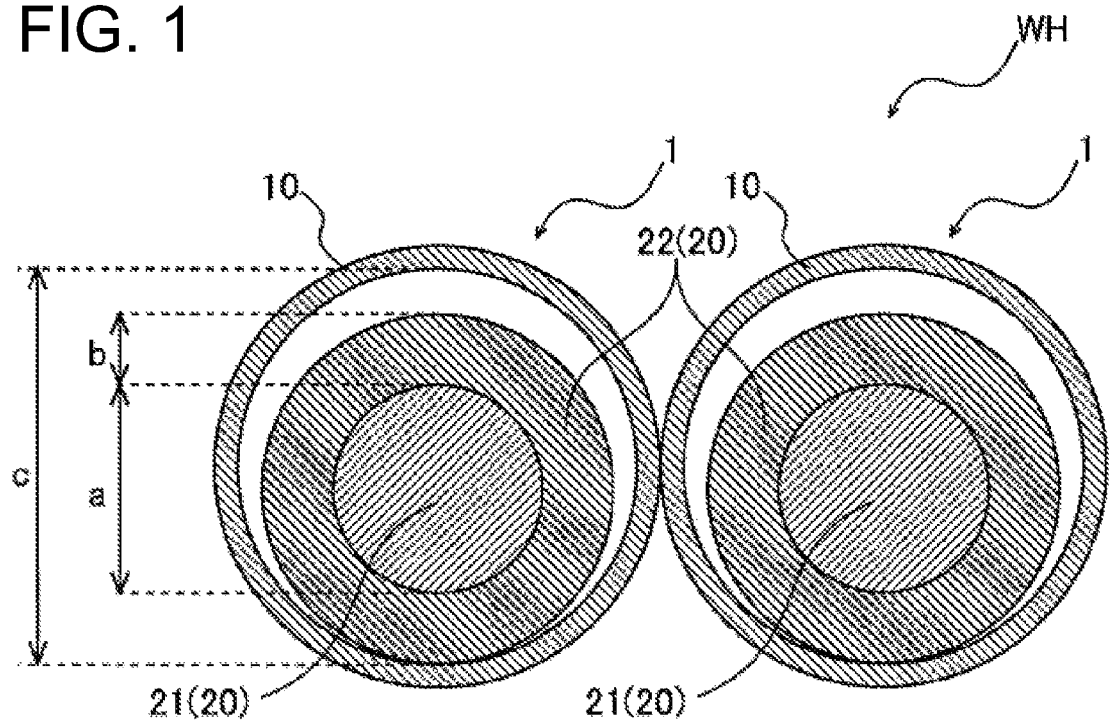
FIG. 1 is a cross-sectional view illustrating an example of a wire harness according to an embodiment of the present disclosure.

FIG. 1 is a cross-sectional view illustrating an example of a wire harness according to an embodiment of the present disclosure. As illustrated in FIG. 1, a wire harness WH includes a shielded electric wire 1, and an example illustrated in FIG. 1 includes two (plurality) shielded electric wires 1. The wire harness WH is not limited to the example illustrated in FIG. 1 as long as the wire harness WH includes at least one shielded electric wire 1 and another configuration. For example, as another configuration, the wire harness WH may be provided with a connector at an end portion of the shielded electric wire, or may be provided with a braid or the like attached to, for example, a metal housing of a vehicle body or an electronic device at the end portion.

The shielded electric wire 1 includes one metal pipe 10 and one electric wire 20. One metal pipe 10 is a pipe member having a tubular shape and is a tubular (for example, cylindrical) pipe member having no notch in a longitudinal direction thereof in a cross-sectional view.

One electric wire 20 includes a conductor 21 and an insulator 22 provided on an outer circumference of the conductor 21. The conductor 21 is made of copper, aluminum, or an alloy thereof. As the insulator 22, for example, Polyethylene (PE), Polypropylene (PP), or foamed PE and PP is used.

In the present embodiment, only one electric wire 20 is provided in one metal pipe 10. Therefore, when it is desired to distribute a plurality of electric wires 20, the same number of metal pipes 10 as the number of electric wires 20 are prepared and one electric wire 20 is arranged in each metal pipe 10. Here, when a plurality of electric wires are accommodated in one large metal pipe, a bending radius R of the shielded electric wire 1 becomes large. However, when one electric wire 20 is accommodated in one metal pipe 10 and a plurality of these are prepared, the bending radius R does not become large, and thus a wiring property can be improved.

Figure 2:
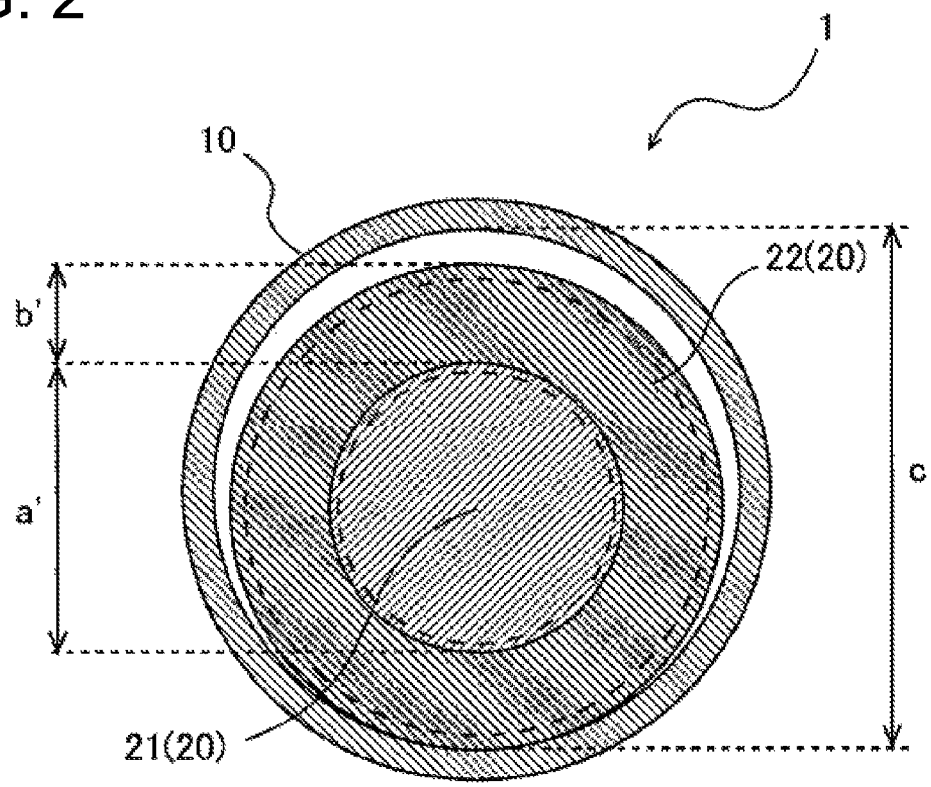
FIG. 2 is a cross-sectional view illustrating a state when an electric wire is thermally expanded.

In the present embodiment, the metal pipe 10 and the electric wire 20 satisfy the following relationship. FIG. 2 is a cross-sectional view illustrating a state when the electric wire 20 is thermally expanded. As illustrated in FIG. 2, in the present embodiment, when an outer diameter of the conductor 21 after thermal expansion with respect to a maximum temperature exposed in the environment is set as a' and a wall thickness of the insulator after thermal expansion with respect to the maximum temperature is set as b', an inner diameter c of one metal pipe 10 is set to satisfy c≥a'+2b'.

Here, when an outer diameter of the conductor 21 at 25° C. is set as a (see FIG. 1), a coefficient of linear expansion of a conductor material of the conductor 21 is set as $\alpha_a$, and a temperature difference between a maximum temperature exposed in the environment where the electric wire 20 is disposed and 25° C. is set as Δt, the outer diameter a' of the conductor 21 after thermal expansion with respect to the maximum temperature is set to a'=a+$\alpha_a$×a×Δt. When a wall thickness of the insulator at 25° C. is set as b (see FIG. 1) and a linear expansion coefficient of the insulator material of the insulator is set as $\alpha_b$, the insulator wall thickness b' after thermal expansion with respect to the maximum temperature is set to b'=b+$\alpha_b$×b×Δt.

With this configuration, even when the electric wire 20 expands to the maximum in the usage environment, the electric wire 20 does not expand beyond an inner surface of the metal pipe 10, and thus it is possible to prevent the electric wire 20 from being crushed by the inner surface of the metal pipe 10.

Figure 3:
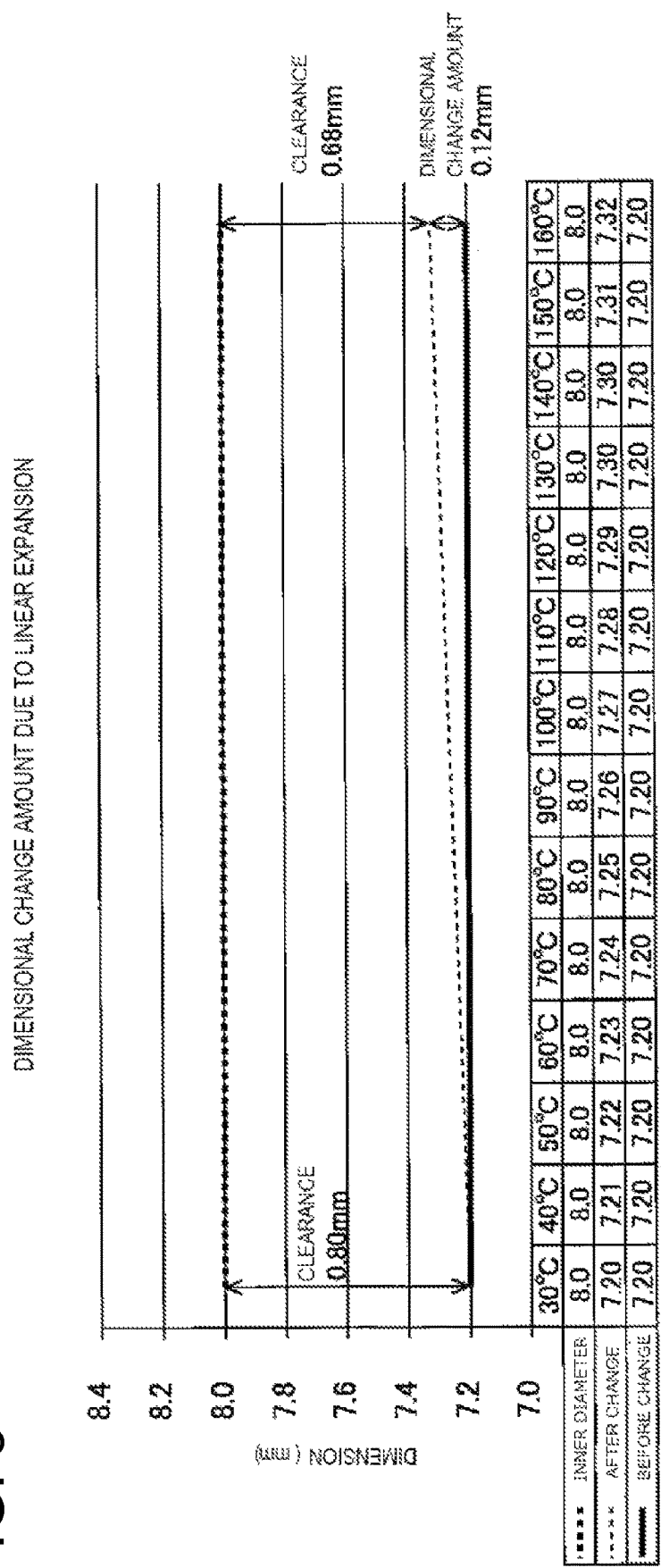
FIG. 3 is a graph illustrating an example of the change of diameter relating to linear expansion.

Next, an example of the shielded electric wire 1 according to the present embodiment will be described. FIG. 3 is a graph illustrating the example. In the example illustrated in FIG. 3, the conductor is aluminum (coefficient of linear expansion 23.6×10$^{-6}$/° C.) and the insulator is polyethylene (coefficient of linear expansion 3.58×10$^{-4}$/° C.). The outer diameter of the conductor at 25° C. is 5.00 mm and the thickness (coating thickness) of the insulator is 1.10 mm. An inner diameter of the metal pipe is set to ϕ8.

In this case, the outer diameter of the electric wire at 30° C. is 7.20 mm. Therefore, a clearance between the outer diameter of the electric wire 20 and an inner diameter of the metal pipe 10 is 0.8 mm. The outer diameter of the electric wire at 40° C. is 7.21 mm, the outer diameter of the electric wire at 50° C. is 7.22 mm, the outer diameter of the electric wire at 60° C. is 7.23 mm, and the outer diameter of the electric wire at 70° C. is 7.24 mm.

The outer diameter of the electric wire at 80° C. is 7.25 mm, the outer diameter of the electric wire at 90° C. is 7.26 mm, the outer diameter of the electric wire at 100° C. is 7.27 mm, the outer diameter of the electric wire at 110° C. is 7.28 mm, and the outer diameter of the electric wire at 120° C. is 7.29 mm.

The outer diameter of the electric wire at 130° C. is 7.30 mm, the outer diameter of the electric wire at 140° C. is 7.30 mm, the outer diameter of the electric wire at 150° C. is 7.31 mm, and the outer diameter of the electric wire at 160° C. is 7.32 mm.

Therefore, even at the maximum temperature (160° C.) exposed in the environment where the electric wire is used, the outer diameter of the electric wire is 7.32 mm, which does not reach the inner diameter of the metal pipe of 8 mm. As a result, a clearance of 0.68 mm between the outer diameter of the electric wire 20 and the inner diameter of the metal pipe 10 is secured.

In this way, by the configurations of the shielded electric wire 1 and the wire harness WH according to the present embodiment, one metal pipe 10 and only one electric wire 20 provided in the one metal pipe 10 are provided. Therefore, the bending radius R can be suppressed by reducing the diameter of the metal pipe 10 as compared with the case where a plurality of electric wires are provided in the metal pipe. The inner diameter c of one metal pipe 10 satisfies c≥a'+2b' when the outer diameter of the conductor 21 after thermal expansion is a' and the wall thickness of the insulator after thermal expansion is b'. Therefore, even when one electric wire 20 thermally expands at the maximum temperature in the usage environment, it is possible to prevent the electric wire 20 from being crushed due to expansion exceeding the inner diameter c of the metal pipe 10. Therefore, it is possible to prevent the electric wire 20 from being crushed while suppressing the bending radius R and improving the wiring property.

Next, a shielded electric wire according to a second embodiment of the present disclosure will be described. The shielded electric wire according to the second embodiment is the same as that of the first embodiment, but the configuration is partially different. Hereinafter, differences from the first embodiment will be described.

Figure 4:
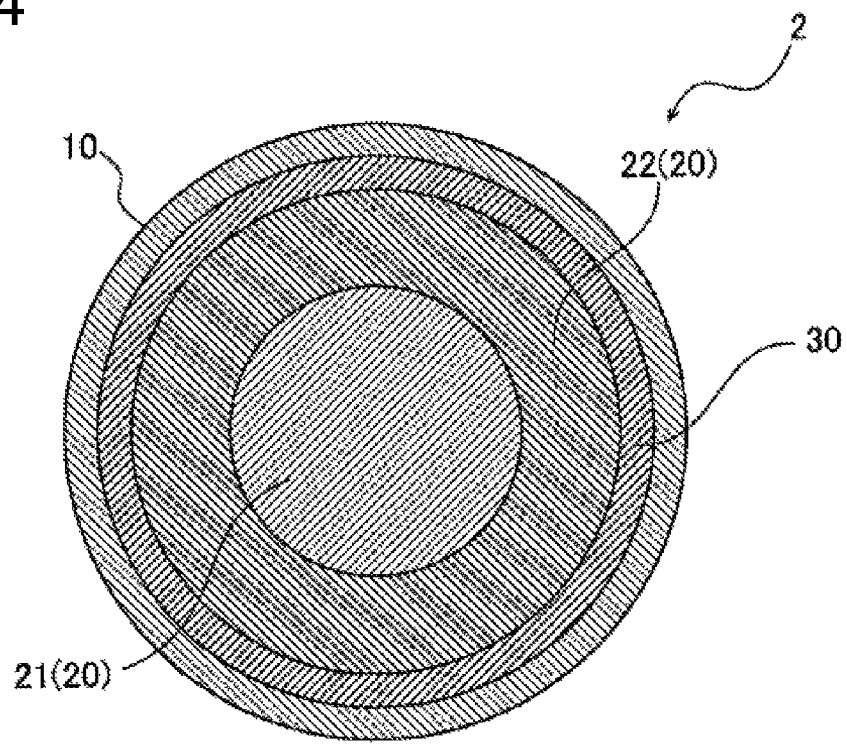
FIG. 4 is a cross-sectional view illustrating a shielded electric wire according to a second embodiment.

FIG. 4 is a cross-sectional view illustrating the shielded electric wire 2 according to the second embodiment. As illustrated in FIG. 4, in a shielded electric wire 2 according to the second embodiment, a thermoplastic elastomer 30 is interposed between one metal pipe 10 and one electric wire 20.

The thermoplastic elastomer 30 is composed of, for example, any one of styrene-based thermoplastic elastomers (SBC and TPS), polyolefin-based elastomer (TPO), polyester-based elastomer (TPEE and TPC), vinyl chloride-based elastomer (TPVC), polyurethane-based elastomers (TPU), and the like, or a combination thereof.

Such the thermoplastic elastomer 30 is softer than the insulator 22 at room temperature (around 25° C.) or the like and does not hinder the expansion of the electric wire 20 during the thermal expansion of the electric wire 20. In particular, the thermoplastic elastomer 30 softens more in a high temperature environment, so that it becomes difficult to inhibit the expansion of the electric wire 20. A part of the thermoplastic elastomer 30 protrudes from both ends of the metal pipe 10, for example, due to the expansion of the electric wire 20, but the protruded part of thermoplastic elastomer 30 returns to its original position when the electric wire 20 cools down.

Figure 5:
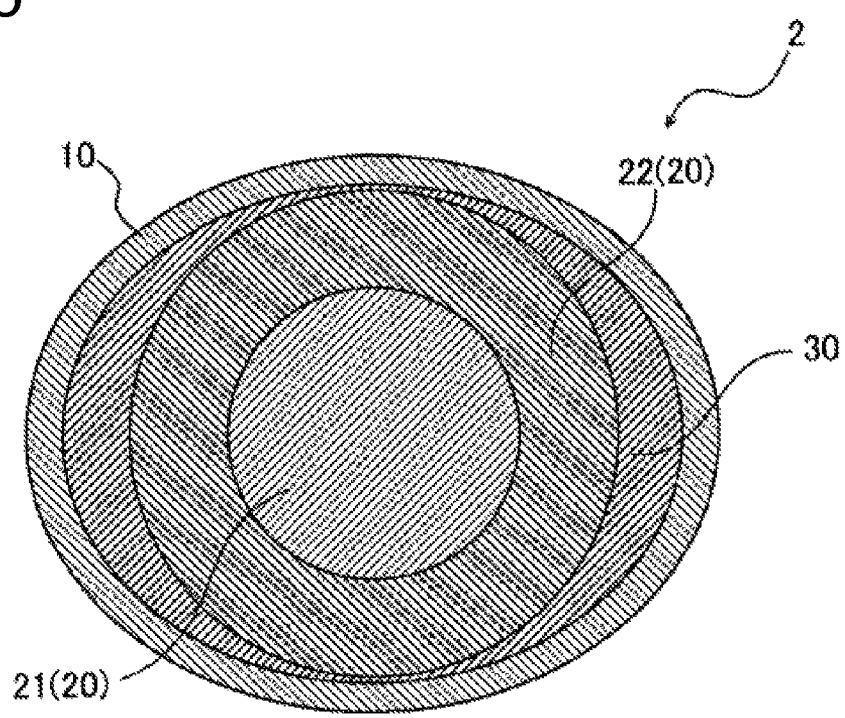
FIG. 5 is a cross-sectional view illustrating another example of the shielded electric wire according to the second embodiment.

FIG. 5 is a cross-sectional view illustrating another example of the shielded electric wire 2 according to the second embodiment. It is assumed that the shielded electric wire 2 according to the second embodiment is bent at the time of wiring to a vehicle or the like. In this case, as illustrated in FIG. 5, the metal pipe 10 has a slightly flat shape, but the thermoplastic elastomer 30 follows the shape, and thus a shape of the thermoplastic elastomer 30 changes while being interposed between the metal pipe 10 and the electric wire 20.

The shielded electric wire 2 according to the second embodiment may be manufactured, for example, by extruding the thermoplastic elastomer 30 onto the electric wire 20 and then passing the extruded thermoplastic elastomer 30 through the metal pipe 10. The thermoplastic elastomer 30 may be extruded onto the electric wire 20 and then formed into a tubular shape by forming a metal plate on the thermoplastic elastomer 30. In this case, a lap portion of the metal plate may be joined by plasma welding, friction stir welding, or the like.

In this way, by the configuration of the shielded electric wire 2 and the wire harness WH according to the second embodiment, similar to the first embodiment, it is possible to prevent the electric wire 20 from being crushed while suppressing the bending radius R and improving the wiring property.

Further, according to the second embodiment, since the thermoplastic elastomer 30 is filled between the metal pipe 10 and the electric wire 20, the heat of the electric wire 20 can be released from the metal pipe 10 through the thermoplastic elastomer 30, and thus the heat dissipation can be improved. As a result, the expansion of the electric wire 20 itself can be suppressed and the possibility that the electric wire 20 is crushed can be further reduced.

Hereinbefore, the present disclosure is described based on the embodiments. However, the present disclosure is not limited to the embodiments described above. Changes may be made without departing from the spirit of the present disclosure and the techniques of the embodiments may be combined if possible, and publicly known and well-known techniques may be combined as appropriate.

For example, the materials and the like shown in the embodiments described above can be changed as appropriate. Although, in the shielded electric wire 2 according to the second embodiment, it is assumed that the thermoplastic elastomer 30 is provided in the entire shielded electric wire 2 in the longitudinal direction, the present disclosure is not limited to this and the thermoplastic elastomer 30 may be provided intermittently or partially.

Here, the details of the above embodiments are summarized as follows.

There is provided a shielded electric wire including: one metal pipe having a tubular shape, and an electric wire being only one electric wire provided in the one metal pipe, and having a conductor and an insulator provided on an outer circumference of the conductor, in which when an outer diameter of the conductor at 25° C. is set as a, a coefficient of linear expansion of a conductor material of the conductor is set as $\alpha_a$, and a temperature difference between a maximum temperature exposed in an environment where the electric wire is used and 25° C. is set as $\Delta t$, an outer diameter a' of the conductor after thermal expansion with respect to the maximum temperature is $a'=a+\alpha_a \times a \times \Delta t$, and when a wall thickness of the insulator at 25° C. is set as b and a coefficient of linear expansion of an insulator material of the insulator is set as $\alpha_b$, an insulator wall thickness b' after thermal expansion with respect to the maximum temperature is $b'=b+\alpha_b \times b \times \Delta t$, and an inner diameter c of the one metal pipe is set to satisfy $c \geq a'+2b'$.

For example, a thermoplastic elastomer is filled between the one metal pipe and the electric wire.

Here, there is also provided a wire harness including the shielded electric wire according to the above.

What is claimed is:

1. A shielded electric wire comprising:
   one metal pipe having a tubular shape; and
   an electric wire being only one electric wire provided in the one metal pipe, and having a conductor and an insulator provided on an outer circumference of the conductor; and
   a thermoplastic elastomer that fills a space between the one metal pipe and the only one electric wire, wherein
   when an outer diameter of the conductor at 25° C. is set as a, a coefficient of linear expansion of a conductor material of the conductor is set as $\alpha_a$, and a temperature difference between a maximum temperature exposed in an environment where the electric wire is used and 25° C. is set as $\Delta t$, an outer diameter a' of the conductor after thermal expansion with respect to the maximum temperature is $a'=a+\alpha_a \times a \times \Delta t$, and when a wall thickness of the insulator at 25° C. is set as b and a coefficient of linear expansion of an insulator material of the insulator is set as ab, an insulator wall thickness b' after thermal expansion with respect to the maximum temperature is $b'=b+\alpha_b \times b \times \Delta t$; and
   at the maximum temperature exposed in the environment where the electric wire is used, an inner diameter c of the one metal pipe is set to satisfy $c \geq a'+2b'$
   wherein an axis line of the thermoplastic elastomer coincides with an axis line of the electric wire.

2. The shielded electric wire according to claim 1, wherein
   the thermal elastomer is softer than the insulator at 25° C.

3. The shielded electric wire according to claim 2, wherein end parts of thermoplastic elastomer are within both ends of the metal pipe at 25° C., and the end parts of the thermoplastic elastomer protrude from the both ends of the metal pipe when the conductor and insulator thermally expand.

4. A wire harness comprising:
   the shielded electric wire according to claim 1.

5. The shielded electric wire according to claim 1, wherein
   a clearance between an outer diameter of the electric wire after thermal expansion with respect to 25° C. and an inner diameter of the metal pipe is equal to or greater than 0.68 mm and equal to or less than 0.80 mm.

* * * * *